June 5, 1956  E. C. LEHNER ET AL  2,748,724
FLAVOR INJECTION VALVE FOR ICE CREAM
Filed July 25, 1950
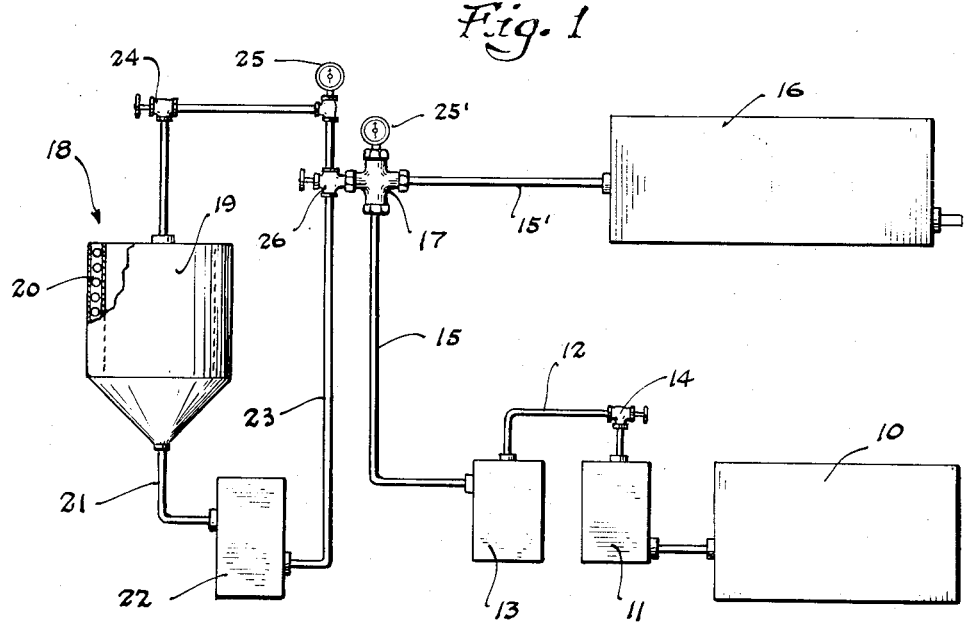
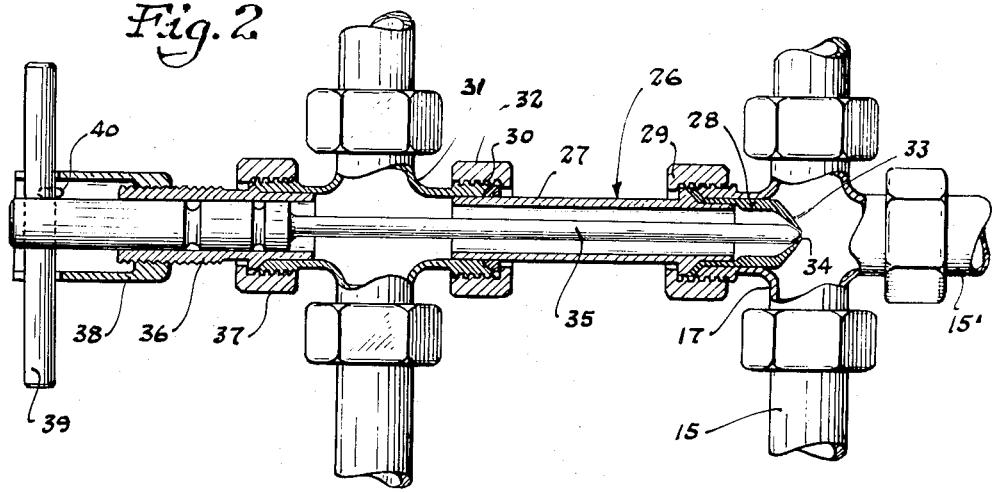
INVENTORS
Edwin C. Lehner
John A. Brendle
BY R.G. Story
ATTORNEY

2,748,724

FLAVOR INJECTION VALVE FOR ICE CREAM

Edwin C. Lehner and John A. Brendle, Chicago, Ill., assignors to Swift & Company, Chicago, Ill., a corporation of Illinois Application July 25, 1950, Serial No. 175,779

3 Claims. (Cl. 107—1)

This invention relates generally to a continuous means of injecting a liquid material into a moving fluid stream, and more particularly to an improved injector valve and method of continuously introducing a stream of solidifiable flavoring material into a moving stream of relatively cool material, such as continuously injecting melted chocolate into a stream of chilled ice cream mix.

It has long been the desire of ice cream manufacturers to produce an ice cream having finely divided discrete particles of solidified flavoring material distributed uniformly throughout the mass of ice cream by means of a continuous process while at the same time maintaining the desired body and texture of the ice cream. Some manufacturers have attempted to solve the foregoing problem by making a product such as chocolate chip ice cream by introducing flakes of solidified chocolate into the frozen ice cream through either the fruit feeder or a separate mixer employed after the ice cream has been extruded from the continuous freezer. Each of the foregoing methods, however, has been unsuccessful, since the body and texture of the ice cream has been adversely affected. Other attempts have been made to introduce a stream of molten chocolate into the frozen ice cream after discharge from a continuous freezer by means of special apparatus which breaks up the solidified chocolate and distributes the particles throughout the frozen ice cream. The latter method is likewise undesirable, since the agitation of the ice cream after discharge from the freezer materially detracts from the quality of the finished product.

It is an object of the present invention, therefore, to provide an improved means for continuously injecting a solidifiable material into a moving stream of liquid material.

A further object of the invention is to provide an improved means for introducing into a moving stream of liquid material a solidifiable material at a carefully controlled uniform rate.

A still further object of the invention is to provide an improved means for injecting a solidifiable material into a stream of liquid material in a form which is readily disintegrated into small particles.

A further object of the invention is to provide an improved means for injecting a solidifiable material into a stream of liquid material which prevents the formation of a solid deposit of solidifiable material about the discharge orifice of the injecting means.

An additional object of the invention is to provide a means for continuously injecting molten chocolate into a chilled ice cream mix in the preparation of chocolate chip ice cream.

Another object is to provide an injector valve for use in the manufacture of chocolate chip ice cream which may be readily disassembled and cleaned.

Additional objects of the invention will be apparent from the detailed description and claims to follow.

Figure 1 of the drawings shows a diagrammatic view of apparatus which may be employed for introducing a melted solidifiable material, such as chocolate, into a chilled ice cream mix and apparatus suitable for continuously freezing the ice cream mix.

Figure 2 is a detailed sectional view of the injector nozzle embodying the present invention.

Referring more particularly to Figure 1 of the drawings, the precooled, unfrozen comestible mix is withdrawn from a mix supply tank 10 through a first-stage mix pump 11 which discharges the comestible mix through a conduit 12 into a second-stage air pump 13. Pump 13 operates at a higher speed than the first-stage mix pump 11 in order to draw the desired amount of air through an adjustable valve 14 in conduit 12, and the desired amount of air is thereby incorporated in the comestible mix to form an air-mix "mixture" or "foam." The aforesaid mixture, under pressure, is then discharged through the mix conduit or mix feed line 15 into the freezing cylinder 16. The mix conduit or feed line 15 is provided with a suitable cross-fitting 17 before entering the freezer so that one side thereof may be connected with suitable flavoring material injecting apparatus 18.

The flavoring material injecting apparatus 18 is comprised of a suitable flavoring material reservoir 19 with a suitable heating means such as heating coil 20 to maintain the flavoring material in a molten condition, and is provided with a suitable flavoring material conduit 21 leading to a positive action sanitary pump 22 which forces the melted flavoring material through the conduit 23 connected with the said cross-fitting 17 in conduit 15 through a flavoring material injector valve 26. The return side of said conduit 23 is provided with a pressure gauge 25 and a back-pressure regulating valve 24 in order to regulate the pressure of the solidifiable flavoring material therein. The flavoring material injector valve 26 is connected with the "cross" 17 so that the flow of material into the comestible mix feed line 15 may be continuous and carefully regulated. When the pressure in the flavoring material injecting system is properly adjusted by adjusting the valve 24 and pump 22, the injector valve 26 is opened to inject the desired amount of flavoring material into the feed line cross-fitting 17 where it solidifies immediately in the form of small irregular globules upon contacting the chilled ice cream air-mix commonly referred to as "foam." The solidified flavoring particles are then carried with the "foam" into the continuous ice cream freezer 16 where they are rapidly subdivided by the mutator and blades attached thereto into uniformly small particles and simultaneously distributed evenly throughout the partially frozen ice cream.

Referring more particularly to Figure 2 of the drawings, the flavor material injector valve 26 comprises an injector valve body 27 and a discharge nozzle or injector valve body seat 28 positioned in one arm of the feed line cross-fitting 17 so that the flow of material through said fitting passes across the discharge opening of the discharge nozzle. The end of the injector valve body 27 is formed so as to closely engage the flanged inner end of the discharge nozzle 28 so that the said body and body seat nest together and are held together by a single nut 29. The inner end of the injector valve body 27 is preferably provided with a ferrule 30 which enables the said seat to be securely held in one arm of the valve cross 31 by a nut 32. The outer end walls of the discharge nozzle 28 taper sharply inwardly to form a small, substantially conical, axial discharge orifice or valve seat 33. The valve seat 33 of the discharge nozzle 28 has a sharp knife edge 34 thereon to prevent liquid congealing and building up a large deposit which would tend to block the cross-fitting 17 and the conduits 15, 15'. The discharge nozzle 28 and valve seat 33 are also so formed and proportioned that the edge 34 of the valve seat 33 extends into the cross-fitting 17 to a point adjacent the vertical center line of the cross-fitting. While the position of edge 34 of the valve seat 33 may vary about 1/16 of an inch on either side of the center line of the cross-fitting 17, substantially greater variations on either side of the center line should not exist. Thus, if the seat 33 were to extend a substantial distance past the said center line, the material being ejected through the discharge opening would be cooled so rapidly by the chilled confection mix that the said material would congeal and block the discharge opening in discharge nozzle 28. And, if the valve seat 33 does not extend sufficiently into the line of flow of the chilled mix, there will be insufficient wiping action across the tip of the valve seat and the solidifiable material will build up and block the discharge orifice.

The tapered inner walls of the discharge nozzle 28 provide a seat for a valve stem 35 extending axially through the valve body 27 and the outer end of which is similarly tapered and closely engages the said tapered inner walls of the discharge nozzle 28. The end of the valve stem 35 is held securely in place within the valve cross 31 of the flavoring or solidifiable material feed line by a valve stem bushing 36 which is drawn tightly into engagement with the valve cross 31 by a nut 37. The valve stem 35 (or the bushing 36) is recessed to provide space for two neoprene sealing rings to prevent leakage of the liquid solidifiable material through the said bushing. The outer end of bushing 36 is threaded externally with 16 threads to the inch instead of the standard 8 threads per inch in order to provide more accurate control of the discharge opening. The valve stem drive collar 38 is threaded internally so as to engage the external threads on the valve stem bushing 36, and the outer end of the said collar 38 and the valve stem 35 are provided with an opening for a valve handle 39 which is held in position by a dowel 40.

In producing chocolate chip ice cream in accordance with the form of the invention disclosed herein, it has been found desirable initially to adjust the continuous freezing apparatus to normal operating conditions, for example, so that the mix temperature is about 40° F. and the mix pressure is approximately 40–60 pounds per square inch. While the continuous freezing apparatus is thus being adjusted to the desired operating conditions, the chocolate supply system is simultaneously being regulated by adjusting pump 22 and valve 24 while maintaining the injector valve 26 in closed position until sufficient pressure is built up in the chocolate injecting system to exceed the mix pressure in the continuous freezing apparatus. When the pressure gauge 25 on conduit 23 indicates a pressure of about 15 pounds per square inch in excess of the mix pressure, as indicated by gauge 25', the flavor material injector valve 26 is opened to permit the desired amount of molten chocolate to enter conduit 16. For example, satisfactory chocolate chip ice cream may be produced by injecting into the mix between about 0.5 and 5.0 per cent chocolate based on the weight of the ice cream mix.

It has also been found desirable to maintain the temperature of the molten chocolate in reservoir 19 at a temperature between approximately 95° and 135° F. When the molten chocolate at the said temperature is injected into the air-mix "foam" having a temperature of approximately 40° F., the chocolate is immediately solidified into relatively small distorted globular particles which are suspended in and carried by the air-mix "foam" into the freezing tube of the continuous freezing apparatus.

The discharge nozzle 28 of the injector valve is so formed and disposed within the cross-fitting 17 that only the tapered portion of the seat is contacted by the chilled ice cream mix. By having the nozzle 28 so disposed it is possible to continuously inject the molten chocolate or other solidifiable flavoring material into the moving stream of chilled ice cream mix without having the chocolate solidify in the nozzle 28 and thereby block its discharge orifice. Also, the discharge nozzle 28 is provided with a sharp knife-like edge 34 in order to prevent solidified material building up on the exterior of the valve seat 33 of the discharge nozzle. By providing a knife-like edge 34 on the nozzle 28, there is only a small area on which solidifiable material may deposit, and the tendency to form a deposit on the tip of said valve seat is substantially eliminated. Any material which might begin to deposit is readily wiped off the knife-like edge of the nozzle 28 by the stream of chilled ice mix moving across the discharge orifice, and this wiping action continually maintains the exterior surface of the nozzle 28 free of a deposit of solidified material.

The present invention makes it commercially feasible to introduce into a moving stream of chilled material many readily solidifiable flavoring materials, such as melted chocolate, chocolate liquor, or pure chocolate syrup into the inlet end of the freezing cylinder of a continuous freezer, either admixed with the several components of the frozen product or separately therefrom, and thereby produce in a continuous process an improved flavored frozen product which has uniformly high quality because the method disclosed herein does not agitate or otherwise disturb the finished product after it leaves the continuous freezer.

As suggested previously, the flavoring material may, if desired, be introduced directly into the continuous freezer cylinder at a point prior to the completion of the freezing operation and before the discharge of the frozen product from the freezing apparatus. In the latter instance the flavoring material might be injected into the chilled and partially frozen product at a point between the first and second freezing cylinder of a two-cylinder continuous freezer. In this embodiment of the invention the chilled and incompletely frozen ice cream mix will perform the same wiping action on the tip of the nozzle and will immediately solidify the melted flavoring material in the same manner as the chilled ice cream "foam" which is employed in the previous embodiment of the invention.

While the specific embodiment of the invention as disclosed herein has been concerned primarily with the preparation of chocolate chip ice cream, it should be understood that other melted flavoring materials or readily solidifiable materials may be employed in the practice of the invention. Any material which is liquefiable at a temperature above the temperature of the ice cream mix or other mix with which the solidifiable material is to be combined and which solidifies into a solid capable of being readily comminuted at the temperature of the mix may be employed in the practice of the applicants' invention. Examples of edible flavoring materials which may be employed in combination with ice cream mixes are butterscotch, a fondant-type flavoring mixture such as mints or the like, a gelatin mixture of fruit, a gelatin ground nut-meat mixture, and a candy-type flavoring mixture such as peanut brittle. Those skilled in the art will be aware of many other solidifiable materials which might be continuously incorporated in various edible and non-edible products in accordance with the present invention.

It should be understood that in those installations which do not require sanitary dairy fittings, each of the several parts of the herein disclosed injector nozzle need not be made as separate parts. For example, the discharge nozzle may be an integral part of valve body. Likewise, the ferrule may be an integral part of the valve body. Other modifications of the disclosed structure will be readily apparent to those skilled in the art.

Obviously, many modifications and variations of the invention as hereinbefore set forth may be made without departing from the spirit and scope thereof, and therefore only such limitations should be imposed as are indicated in the appended claims.

We claim:

1. A sanitary flavor-injecting valve in association with continuous freezing apparatus and a flavor material feed line, which comprises a tubular valve discharge nozzle having an outer end which converges inwardly toward the axis of the nozzle to form an internal valve seat and a discharge opening of lesser diameter than the nozzle proper, a valve body which coacts with the said nozzle and connects said nozzle with the flavor-material feed line, said valve nozzle and valve body having the inner and outer ends thereof respectively provided with flanges which closely engage to form a readily separable sanitary seal facilitating the cleaning of the valve members, a valve stem extending axially through said valve body and coacting with the said valve seat, and means on said valve stem to regulate the flow of material through said nozzle, said discharge nozzle valve seat extending into the mix feed line of the freezing apparatus to about the center thereof.

2. A sanitary injector valve for continuously introducing melted solidifiable flavoring material into a continuously moving stream of relatively cool frozen dessert material which comprises a tubular valve discharge nozzle having an axial discharge opening with a smaller cross section than the nozzle proper with a sharp edge thereon and a tapered valve seat, a valve body which coacts with said discharge nozzle connecting said nozzle with a supply source of melted solidifiable flavoring material, said valve nozzle and valve body having the inner and outer ends thereof respectively provided with flanges which closing engage to form a readily separable sanitary seal thereby facilitating the cleaning of the valve members, a valve stem extending axially through said body and coacting with said valve seat, and means on said valve stem to regulate the flow of melted flavoring material through said discharge nozzle, said discharge nozzle being of such length as to extend into the feed line containing the relatively cool frozen dessert material to about the center thereof.

3. A sanitary injector valve for continuously introducing a melted solidifiable material into the feed line of a continuous freezing apparatus from a supply source of said melted material which comprises a tubular valve discharge nozzle having its outer end tapered inwardly to form a valve seat and discharge opening, a valve body which coacts with said nozzle and is interposed between said nozzle and said supply source, said valve nozzle and valve body having the inner and outer ends thereof, respectively, provided with mating flanges which closely engage to form a readily separable sanitary seal, thereby facilitating the cleaning of the valve members, a valve stem extending axially through said valve body and movable lengthwise into and away from the valve seat of said nozzle to govern the flow of material through said nozzle, and means associated with said stem for accomplishing lengthwise movement of said stem.

References Cited in the file of this patent

UNITED STATES PATENTS

| | | |
|---|---|---|
| 651,829 | Copland | June 19, 1900 |
| 1,306,216 | De Giorgio | June 10, 1919 |
| 1,736,863 | Prescott | Nov. 26, 1929 |
| 2,062,277 | Routh | Nov. 24, 1936 |
| 2,190,226 | Alexander | Feb. 13, 1940 |
| 2,246,871 | Balch | June 24, 1941 |
| 2,249,311 | Johnston et al. | July 15, 1941 |
| 2,316,165 | Howser | Apr. 13, 1943 |
| 2,347,083 | Connellee et al. | Apr. 18, 1944 |
| 2,389,084 | Routh | Nov. 13, 1945 |
| 2,531,127 | Hershey et al. | Nov. 21, 1950 |
| 2,576,842 | Lehner | Nov. 27, 1951 |
| 2,646,757 | Hackmann | July 28, 1953 |